United States Patent
Davies (10) Patent No.: US 10,419,785 B2
(45) Date of Patent: Sep. 17, 2019

(54) DISTRIBUTED LEARNING VIDEO ENCODER/DECODER

(71) Applicant: Cisco Technology, Inc., San Jose, CA (US)

(72) Inventor: Thomas J. Davies, Guildford (GB)

(73) Assignee: Cisco Technology, Inc., San Jose, CA (US)

(*) Notice: Subject to any disclaimer, the term of this patent is extended or adjusted under 35 U.S.C. 154(b) by 23 days.

(21) Appl. No.: 15/655,965

(22) Filed: Jul. 21, 2017

(65) Prior Publication Data

US 2019/0028741 A1    Jan. 24, 2019

(51) Int. Cl.
| H04N 21/00 | (2011.01) |
| H04N 21/2343 | (2011.01) |
| H04N 21/6379 | (2011.01) |
| H04N 21/234 | (2011.01) |
| H04N 21/236 | (2011.01) |
| H04N 17/00 | (2006.01) |
| H04N 19/00 | (2014.01) |
| H04N 21/6547 | (2011.01) |

(52) U.S. Cl.
CPC ....... *H04N 21/2343* (2013.01); *H04N 17/004* (2013.01); *H04N 19/00* (2013.01); *H04N 21/236* (2013.01); *H04N 21/23406* (2013.01); *H04N 21/23418* (2013.01); *H04N 21/6379* (2013.01); *H04N 21/6547* (2013.01)

(58) Field of Classification Search
USPC .................................................. 375/240.02
See application file for complete search history.

(56) References Cited

U.S. PATENT DOCUMENTS

| 7,023,914 B2* | 4/2006 | Furukawa | H04N 19/139 375/240.02 |
| 2006/0114985 A1* | 6/2006 | Linzer | H04N 19/00 375/240 |
| 2013/0287094 A1* | 10/2013 | Song | H04N 19/105 375/240.02 |
| 2016/0127748 A1* | 5/2016 | Glazer | H04N 19/85 375/240.08 |

(Continued)

OTHER PUBLICATIONS

"Reconfigurable video coding", Wikipedia, https://en.wikipedia.org/wiki/Reconfigurable_video_coding, last accessed May 25, 2017, 2 pages.

(Continued)

*Primary Examiner* — Behrooz M Senfi
(74) *Attorney, Agent, or Firm* — Edell, Shapiro & Finnan, LLC (57) ABSTRACT

In one embodiment, one or more portions of video content that were encoded by a video encoder are identified. The one or more portions of video content are to be analyzed for improving encoding performance of the video encoder. The one or more portions of the video content are stored. During an idle time period of the video encoder, the one or more portions of video content are analyzed in combination with a test set stored by the video encoder in order to modify one or more functions of an encoding process used by the video encoder. Based on the analysis, one or more modifications to the encoding process are determined that result in improved performance of the video encoder.

22 Claims, 8 Drawing Sheets

(56) References Cited

U.S. PATENT DOCUMENTS

2017/0078574 A1\* 3/2017 Puntambekar ..... H04N 5/23254
2018/0176576 A1\* 6/2018 Rippel ................. H04N 19/126

OTHER PUBLICATIONS

"Machine learning for video transcoding", YouTube Engineering and Developers Blog, May 13, 2016, https://youtube-eng.googleblog.com/2016/05/machine-learning-for-video . . . , 5 pages.
Christoph H. Lampert, "Machine Learning for Video Compression: Macroblock Mode Decision", ICPR 2006, 18th International Conference on Pattern Recognition, Aug. 20-24, 2006, Hong Kong, China, DOI: 10.1109/ICPR.2006.778, 5 pages.

\* cited by examiner

FIG.9 # DISTRIBUTED LEARNING VIDEO ENCODER/DECODER

TECHNICAL FIELD

The present disclosure relates to video encoding and decoding techniques.

BACKGROUND

Video codec standards and implementations are difficult to design for real-world performance as there is a limit to the amount of video data that can be used as part of the design process. Usually video codec standards are developed with a slow reference encoder and small number of video sequences covering a short segment of video content, e.g., 10s of seconds of video.

Real-time encoders are typically designed using larger sets of data, but still the design phase has access to a much smaller amount of data than an encoder in the field will encounter in its lifetime. This leads to suboptimal over-fitted designs, both of the original video codec standard and of implementations to the original video codec standard.

DESCRIPTION OF EXAMPLE EMBODIMENTS

Overview

In one embodiment, one or more portions of video content that were encoded by a video encoder are identified. The one or more portions of video content are to be analyzed for improving encoding performance of the video encoder. The one or more portions of the video content are stored. During an idle time period of the video encoder, the one or more portions of video content are analyzed in combination with a test set stored by the video encoder in order to modify one or more functions of an encoding process used by the video encoder. Based on the analysis, one or more modifications to the encoding process are determined that result in improved performance of the video encoder. The video encoder may be one of a plurality of video encoders deployed in the field that are in communication with a central entity to collaborate on how to tune the encoding process used by the respective video encoders.

DETAILED DESCRIPTION

During development of a video codec standard or implementation of a video encoder, a test set of video content is identified. The test set is used to determine whether a video codec tool should be permitted or not based on simulations. Examples of video codec tools are motion vector prediction techniques, intra prediction modes, multi-reference prediction, etc.

Often, a video codec tool can be over-fitted to a test set. When trying to tune an encoder, the designer configures the encoder to do the best possible over a wide range of video content, but again, using a small test set. Consequently, when the video encoder is put into real-world use, it does not perform very well.

There is a large domain of parameters that could be tuned in a video encoder, and consequently, this is one of the issues with overfitting. For example, even though the H.264 video codec standard has only a handful of encoding modes, these can be combined in a very large number of ways. How these mode combinations are selected is the purpose of the encoder design, and controlling this mode selection process in a real-time encoder can require a large number, typically 50 or more, of parameters that could be turned. These parameters need to be effective in trading off bit rate, distortion or error, and the time or complexity required or available to reach a given level of compression performance. In more recent/modern video codecs (such as HEVC or VP9), there are many more modes, and consequently combinations of modes could require hundreds or thousands of parameters for control. Examples of such modes in a modern codec include (but are not limited to):

Intra prediction modes
Inter modes
Interpolation filter selection
Choice of transform
Coefficient scan direction
Block sizes for prediction
Block sizes for transforms
Block quantizer parameter
Reference frame selection In a reference video encoder used in standards development, all—or at least, a great many—of these mode combinations are tried to obtain the best cost in terms of trade-off between quality and bit rate. Typically, a reference encoder will not consider real-world constraints such as constant bit rate or error resilience, and will not be configured to detect and respond to changes in video content, such as cuts or fades. In a real-world video encoder, shortcuts are taken, based on a combination of pre-analysis and early termination. These shortcuts are often based on heuristics or simplified evaluations that are typically controlled by a number of selected parameters. Many video real-world encoders adapt to content features and respond to scene changes. In addition, many global features of an encoder algorithm, such as the Group of Picture (GOP) structure, the selection of reference frames, the identification of different frame types (for example for temporal scalability) and the distribution of bits between frames can be controlled and adapted within an encoder.

The encoder tries to work out what could be good modes to test based on pre-analysis, tests a number of them and stops when a good enough answer has been achieved, or enough work has been done. Pre-analysis evaluates video data to extract values or features and pre-selects a method of encoding (for example, a GOP structure) or a number of modes to be tested. Pre-analysis parameters are applied to control the combination of features or values used to make this selection. Early termination parameters involves identifying an ordered list of modes to test, and for each point in that list, there is a stopping criteria controlled by a number or numbers, which is a parameter that can be tuned. The encoder designer attempts to work out appropriate parameters for controlling the encoder algorithm at a global (multi-frame), frame, and block level, subject to constraints of time (both average and worst-case), bit rate and performance, with highly variable content.

It is desirable to automate this process much more, and make use of vast amounts of real-world video content that devices, such as video conferencing endpoints or streaming video encoders, experience in the real-world, or other real implementations. It is possible to perform local operations within an encoder for generating data about different encoding strategies and optimization strategies to improve that individual encoder. But this local knowledge gained by a video encoder can be collated globally to improve the video encoders out in the field. Hence, crowd-sourcing of deployed video encoders can be exploited. Video encoders can send data back to a centralized intelligence center or entity.

Presented herein is a system and methods by which individual video encoders in the field can adapt their encoding algorithms over time. In one example, video encoder deployments can feed back improved encoder configurations to support design optimizations. To this end, video encoders can perform "experiments" on stored/recorded video from real applications in a massively distributed manner. These experiments can cover non-compliant variations of video codec tools as well as different compliant encoder strategies, resulting in new codec designs.

In the solution presented herein, the tuning operations are moved out of the lab environment and instead are placed in a real-world video codec that is out in the field taking in real-word video data.

Figure 1:
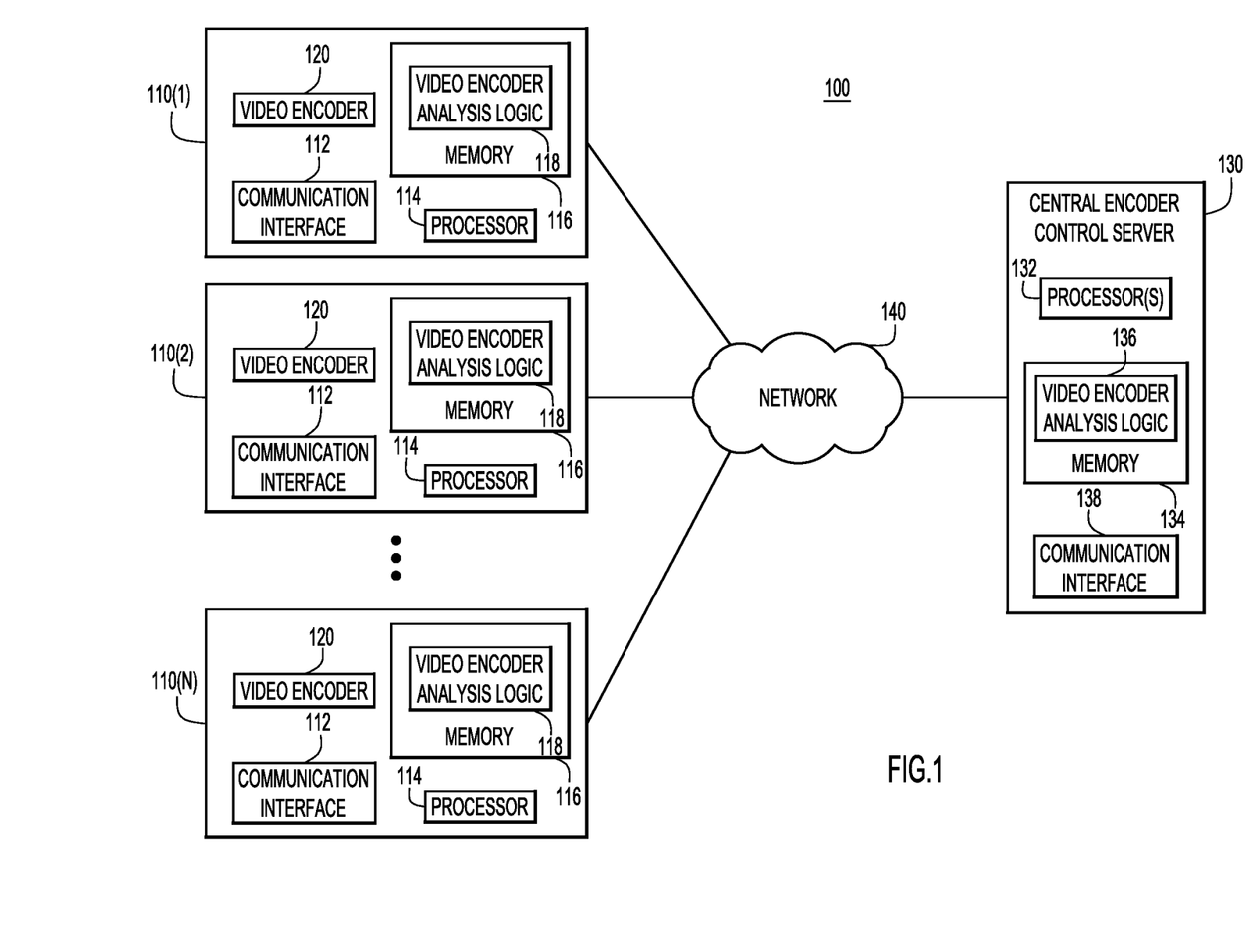
FIG. 1 is block diagram of a system in which the modifications are made video encoders in the field through a distributed learning process, according to an example embodiment.

Reference is first made to FIG. 1. FIG. 1 shows a system 100 that includes a plurality of devices 110(1)-110(N) that include video encoding capabilities, a central encoder control server 130 and a network 140. The devices 110(1)-110(N) may take any of a variety of forms, such as video conference endpoints, video streaming servers, etc. Regardless of the form or platform of the respective devices 110(1)-110(N), each includes, in some form or variation thereof, a communication interface 112, a processor 114, memory 116 that stores software instructions for video encoder analysis logic 118 and a video encoder 120. The communication interface 112 may be, for example, one or more network interface cards that enable wired and/or wireless network connectivity. The processor 114 may be a microprocessor or microcontroller, and may be embodied as a plurality of processors. The video encoder 120 may be embodied as separate component in hardware form, such as in one or more application specific integrated circuits (ASICs) or in software form (residing in memory 116) that includes instructions, which when executed by the processor 114, cause the processor to perform video encoder functions. Even if the video encoder is in hardware form, it is configurable in terms of various encoding parameters used by the video encoder when encoding video.

The central encoder control server 130 is a central entity that is in communication with the devices 110(1)-110(N) as needed to perform encoder optimization analysis based on data that the devices 110(1)-110(N) send to the control server, as described in more detail below. The control server 130 includes one or more processors 132, memory 134 that stores software instructions for video encoder analysis logic 136 and a communication interface 138. The processors 132 may take the form of one or more microprocessors and the communication interface 138 may be embodied by one or more network interface cards to enable wired and/or wireless network connectivity. The video encoder analysis logic 136 may perform operations similar to those performed by video encoder analysis logic 118 (resident in each device 110(1)-110(N)), but based on data obtained for a plurality of video encoders in the field.

The network 140 may be any combination of local area networks, wide area networks and wireless networks.

The video encoder 120 in the respective devices 110(1)-110(N) deployed in the field has access to original/real-world video as its input. The original video may be any type of video content that is to be encoded for transmission to another device. For example, device 110(1) may be a streaming server that serves encoded video to a plurality of video endpoints where users watch video. Device 110(2) may be a video conference endpoint that is part of a network of video conference endpoints to provide video conferencing capabilities.

Video encoder 120 in the devices 110(1)-110(N) has access to test video that is distributed with that encoder instance, so that in idle time the video encoder 120 can run a process on locally captured video and on the fixed test set. The video encoder analysis logic 118 can perform machine learning (ML) to partition data into a training set and an evaluation set. In other words, the video encoder analysis logic 118 may use a standard training set distributed with the video encoder 120 and then use locally captured video as an evaluation set to perform training to evaluate the encoder performance on the locally captured video. The locally captured video may also be included as part of the training set that gets modified over time to be more typical of what the video encoder in that device is encoding.

One unique aspect of the techniques presented herein is that the video encoder in the field uses real-world video to learn about ways to optimize one or more parameters of the video encoder process and how to tune those parameters. Current techniques involve a fixed test set in a lab environment, whereas in accordance with the embodiments presented herein, there is no control over the test set. The test set will vary instances of the video encoder in the field. Moreover, the test set can be combined centrally by the central encoder control server 130.

"Good" encoded output of a video encoder is difficult to measure in a fast, real-time manner. Offline iteration and analysis by the central encoder control server 130 can assist with this evaluation, in accordance with one embodiment. Examples of metrics by which encoded video quality may be measured include Peak Signal-to-Noise-Ratio (PSNR), Peak Signal-to-Noise Ratio Human Visual System (PSNR-HVS), and Structural Similarity (SSIM).

In one embodiment, the distributed computing power of the devices 110(1)-110(N) is used to derive more representative quality metrics in order to provide a way to evaluate video encoder performance on real-world video that is more closely matched to the HVS. Three features may be compared: bit rate, quality and speed. Bit rate and quality are usually combined into a single measure called Bjontegaard Delta Rate (BDR). BDR is the difference in average rate for a given quality compared with a reference. A reference encoder is run at a number of quality points, and that gives a curve for bit rate versus quality. A given encoder is run to obtain bit rate versus quality, and then the curve of that given encoder is compared to the reference encoder curve. The difference between the two curves is the BDR number. This difference indicates on average how many extra bits are needed to be transmitted by the encoder to achieve the same quality. The goal is for the BDR number to be as low as possible, ideally zero or negative.

In a real-world encoder in the field, the trade-off is with respect to speed. The quality and bit rate are calculated, but speed is also to be taken into account. Tuning of one or more encoding parameters is made for some combination of the BDR number and a speed measurement, for example encoded frames per second.

In accordance with one embodiment, there is two-way communication between the video encoders 120 of the devices 110(1)-110(N) and a central intelligence center, i.e., the video encoder control server 130. Video encoder 120 of the devices 110(1)-110(N) is shipped with a number of default parameters, and operates with those parameters. The video encoder analysis logic 118 detects when the video encoder 120 has encoded some problematic video, or records typical video that the video encoder 120 encodes. The video encoder analysis logic 118 stores this video snippet, and performs iterations of tuning on the video snippets using a test set. Devices 110(1)-110(N) may communicate improved parameters it has determined and/or some characteristics of the video snippets upstream to the video encoder control server 130. For example, the video encoder analysis logic 118 may determine certain features of the video with what is the best mode to encode that video (called classification data) and sends classification data to the central encoder control server 130. The central encoder control server 130 uses the classification to tune encoding parameters. This is referred to herein as a "push" mode.

Conversely, in a "pull mode", the central encoder control server 130 collates these best parameters and distributes them to the various encoders as a seed for searches or further tuning to be performed by the video encoders 120 in the devices 110(1)-110(N). For example, the central encoder control server 130 may send encoding parameters to one or more of the plurality of devices 110(1)-110(N) indicating that "encoder xyz" achieved some gain with "ABC parameters" so use "ABC parameters".

Thus, according to the embodiments presented herein, a self-optimizing video encoder in the field uses real-world video data. Performance evaluation and adjustments may be made based on various metrics, such as BDR, which is not heretofore known to be done in the field. Measurements may be made by the video encoders 120, during idle or offline time.

Figure 2:
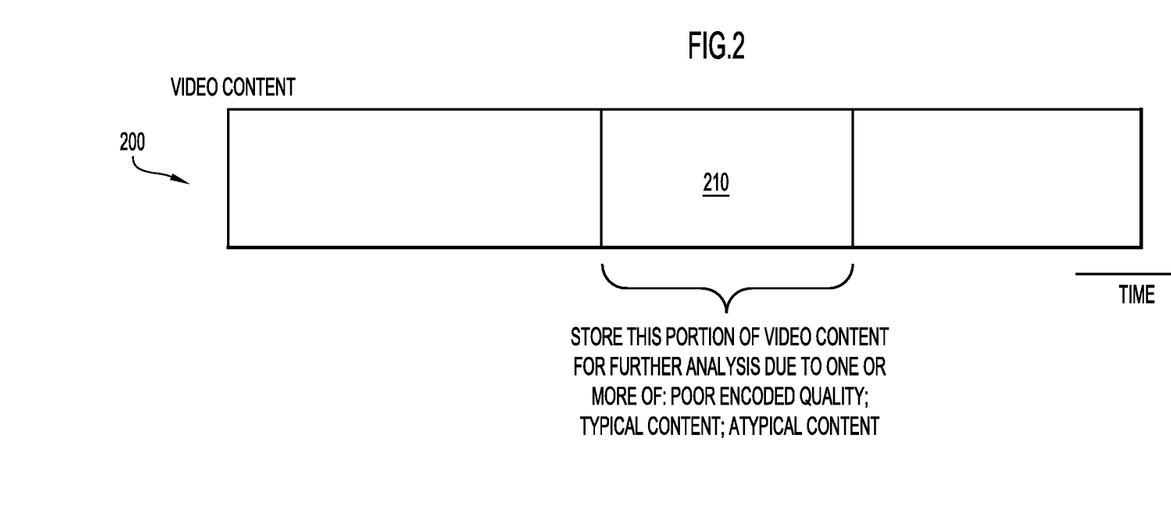
FIG. 2 is a diagram showing the capturing of video content that is analyzed by a video encoder, according to an example embodiment.
Figure 3:
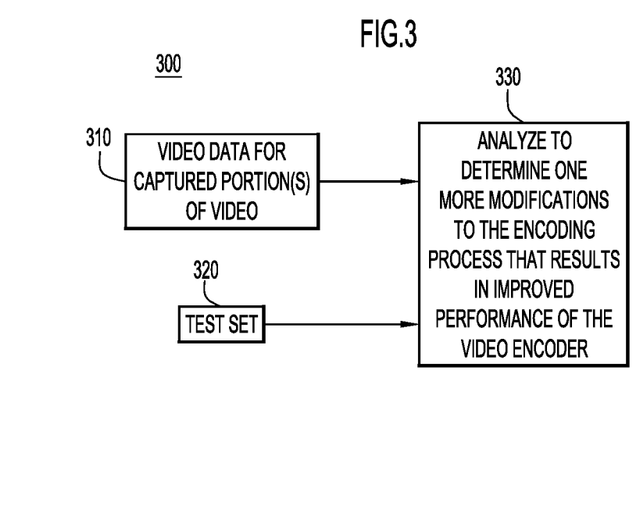
FIG. 3 is a flow chart depicting a process or analyzing captured video content at a video encoder, according to an example embodiment.

Reference is now made to FIGS. 2 and 3, with continued reference to FIG. 1. The techniques presented herein use a combination of locally captured video and a centrally distributed test set to optimize the video encoder in the field. FIG. 2 shows a timeline of video content 200 that a video encoder of one of the devices 110(1)-110(N) shown in FIG. 1, receives as input to be encoded during typical/normal operation. A portion 210 of the video content 200 is captured/stored for further analysis. This portion 210 may be flagged to be stored for further analysis due to one or more of: poor encoded quality, typical content received as input by the video encoder, or atypical content received as input by the video encoder.

As shown in FIG. 3, a method 300 is performed by which, at 310, the video data for one or more captured portions (e.g., portion 210 shown in FIG. 2) is stored. The video encoder analysis logic 118 automatically identifies video snippets/portions that are determined to be worthy of or need of further analysis (for whatever reason they are flagged). At 320, the test set distributed with the video encoder is supplied as input to operation 330. At 330, the captured video portion(s) is analyzed to determine one or more modifications to the encoding process used by the video encoder that results in improved performance of the video encoder. Thus, according to the method 300, the centrally distributed test set 320 is augmented with locally captured video if the encoder identifies anomalies or problems or some particularly difficult video content. The video encoder adds that to the test set and tries different optimizations strategies.

As described above, the devices 110(1)-110(N) may be video conferencing endpoints, streaming servers or broadcast video encoder hardware, for example, and have an offline tuning mode. During normal operation, in method 300, input video is recorded along with encoder state and encoding strategy metadata, for example in a rolling window. An example of internal state would be the reference buffer contents and bitstream buffer. Encoding strategy metadata may include the encoding modes explored and the costs and methods used to choose between them.

Various snippets of interest could be stored. In the offline training mode, during operation 330 of method 300, an encoder could attempt to retune its own encoding algorithm to improve performance. For example, a number of configuration state variables covering various decision thresholds are tuned. Tuning may involve strategies like simulated annealing and genetic algorithms to determine configuration variables. This tuning can trade off encoding speed versus quality to produce gains at selected operating points. Again, tuning could take place during down/idle times on snippets locally recorded. Results from pre-analysis to categorize content (e.g., scene detection) may also be incorporated so that different rules may be applied to different types of content.

Figure 4:
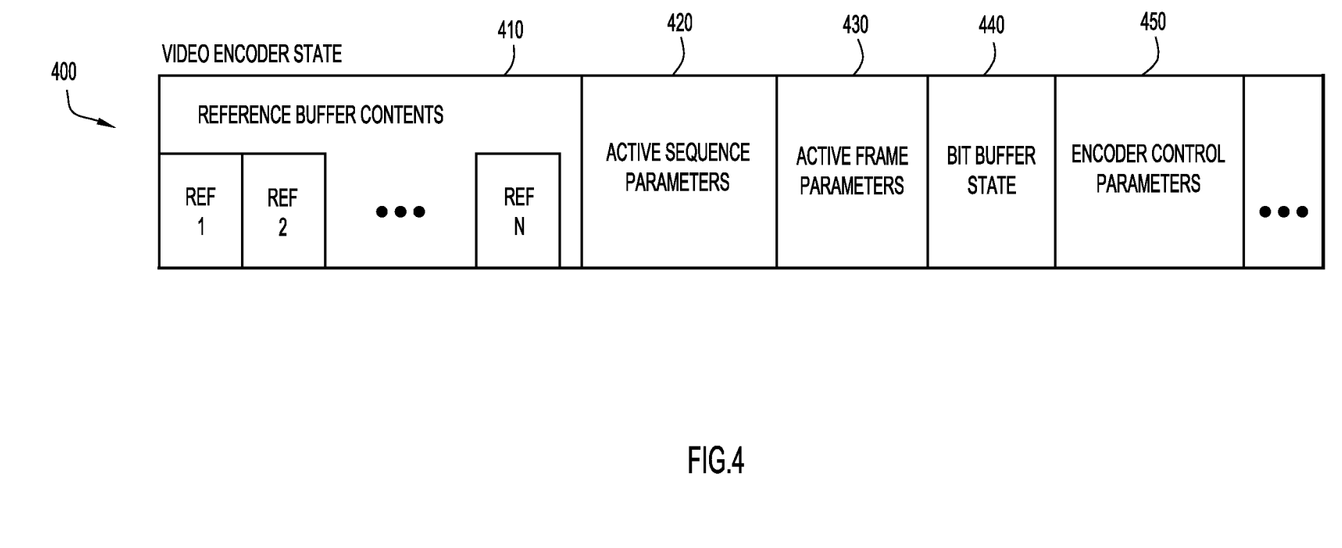
FIG. 4 is a diagram illustrating how state of the video encoder is saved, according to an example embodiment.

Reference is now made to FIG. 4. The devices 110(1)-110(N) have a rolling memory of input video and encoder state, and when the right conditions are met, the contents of this memory are written out to permanent storage. The encoder state includes all the parameters needed for any encoder to start encoding the same frames from the same position (reference buffer state and bit buffer state, for example), and the internal encoder tuning parameters. For example, as shown in FIG. 4, the video encoder state is shown at 400, and includes reference buffer contents 410 shown as Ref1, Ref2, . . . , Ref N, active sequence parameters 420, active frame parameters 430, bit buffer state 440, and encoder control parameters 450. The video encoder state is stored to ensure replicability of the test encoder initial conditions and target operations. This means that the encoder (or another identical copy of the encoder software) could exactly replicate its encoding process for these frames if it was useful to replicate some particularly problematic encoding process. Alternatively, the video encoder analysis logic running in the devices 110(1)-110(N) could simply make use of the content as a test sequence.

Provided with suitable quality metrics, this allows the deployed encoder to learn and potentially diverge from other deployed video codecs and optimize its encoding algorithm for the type of content for which it typically encodes in normal use.

The tuning parameters can consist of an almost complete description of a video encoder algorithm, including parameters controlling:
(1) Which modes to evaluate, in what order and under what circumstances for each block size, based on a classification of block characteristics but also content type;
(2) Feature selection and content type classification for groups of frames, frames or blocks or regions within a frame;
(3) How to traverse hierarchical block structures in the most efficient way;
(4) How to distribute work between different frames and blocks within a frame; and
(5) What metrics to use to evaluate bit rate and quality costs, and when these are reliable and when are they not reliable.

Figure 5:
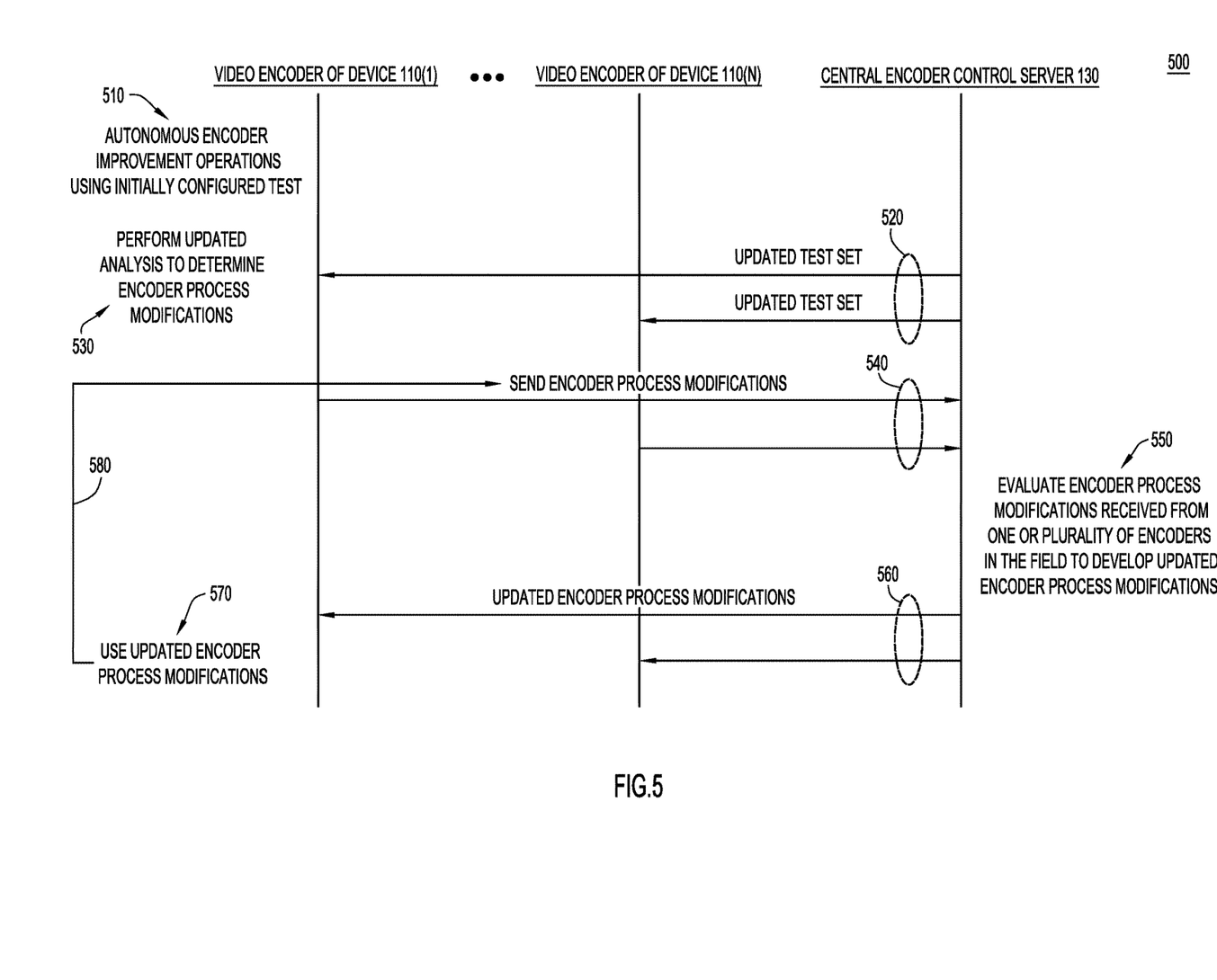
FIG. 5 is a sequence diagram depicting the distributed learning process, according to an example embodiment.

Reference is now made to FIG. 5. FIG. 5 shows a sequence diagram for a distributed learning process 500 by which video encoders of devices 110(1)-110(N) are in communication with the central encoder control server 130. The process 500 is a collaborative scheme to use crowd-sourcing and centralized analysis to improve the performance of video encoders in the field. Reference is also made to FIGS. 1-4 for purposes of this description. At 510, the video encoder analysis logic 118 performs the autonomous encoder improvement operations using the initially configured test set, as described above in connection with FIGS. 2-4. At some point in time, the central encoder control server 130 may distribute an update test set to the devices 110(1)-110(N) for use by the video encoders 120 in the field. This is shown at 520. At 530, the video encoder analysis logic 118 may use the updated test set to perform updated analysis to determine encoder process modifications, again, using the techniques described above in connection with FIGS. 2-4.

At 540, one or more of the devices 110(1)-110(N) send their respectively learned encoder process modifications to the central encoder control server 130. At 550, the video encoder analysis logic 136 of central encoder control server 130 evaluates the encoder process modifications received from one or plurality of encoders in the field to develop updated encoder process modifications. At 560, the central encoder control server 130 sends the updated encoder process modifications to one or more of the devices 110(1)-110(N). At 570, the video encoders 120 in the devices 110(1)-110(N) can use the updated encoder process modifications for operation and for updated analysis. The process may be looped as shown at 580 such that operations 540, 550 and 560 are repeated. Moreover, while FIG. 5 shows operations 510, 570 and 580 occurring at device 110(1), it is to be understood that those operations are also occurring at device 110(N). That is, a plurality of, if not all of, the devices 110(1)-110(N) are participating in the process 500.

Figure 6:
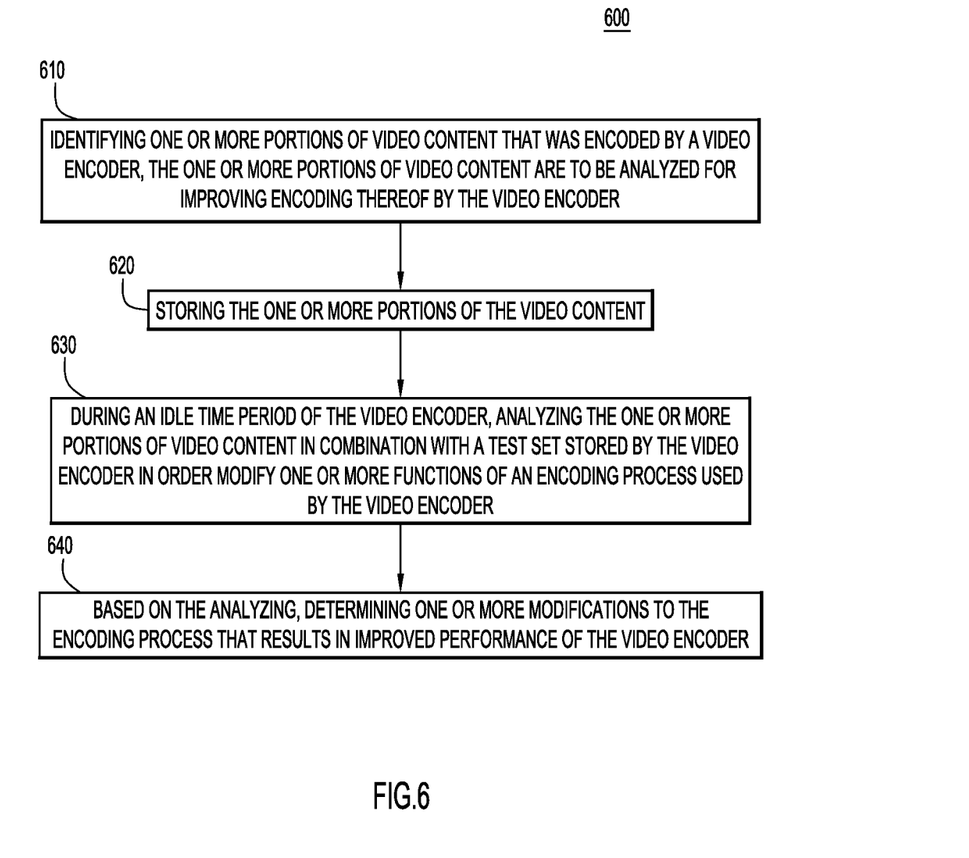
FIG. 6 is a flow chart depicting operations performed at a video encoder, according to an example embodiment.

Reference is now made to FIG. 6. FIG. 6 depicts a flow chart for a process 600 that represents the overall process flow according to the embodiments described herein. Reference is also made to FIGS. 1-5 for purposes of this description. The process 600 is generally representative of operations performed by the video encoder analysis logic 118 running in the devices 110(1)-110(N). At 610, during normal operation of the video encoder 120, one or more portions of video content that was encoded by the video encode are identified. The one or more portions of video content are to be analyzed for improving encoding thereof by the video encoder. As described above, these portions or snippets may those which: (a) gave poor quality (quality analysis); (b) are most typical content seen by the encoder (based on feature extraction and a representative feature vector); and/or (c) are novel content types (based on feature extraction and a representative feature vector). Thus, the identifying operation 610 involves identifying the one or more portions of video content according to whether the one or more portions are one or more of: video content that results in poor quality after encoding, video content that is typical to the video encoder; or video content that is atypical to the video encoder.

At 620, the one or more portions of video content are stored in more permanent memory. At 630, during an idle/offline time period of the video encoder, analysis is made of the one or more portions of video content in combination with a test set stored by the video encoder in order modify one or more functions of an encoding process used by the video encoder. At 640, based on the analysis at 630, one or more modifications to the encoding process are determined that results in improved performance of the video encoder. Thus, as depicted by operations 630 and 640, during offline periods of time of the video encoder, analysis is made based on a self-identified test set and certain captured video to make optimizations to the encoding strategy used by the video encoder.

As described above in connection with FIG. 4, during operation 620, the state of the video encoder is stored while the video encoder encoded the one or more portions of video content. The state includes content of internal buffers and data of state variables of the encoding process.

When, during operation 640, gains are identified by new encoder strategies (the one or more modifications to the encoding process that results in improved performance), those new encoder strategies may be tested/trialed during an offline mode on new video content to be encoded, before being deployed in the encoder. Thus, the process 600 may further include capturing and storing new video content obtained by the video encoder, and during an idle time period of the video encoder, the encoding process is applied using the stored state of the video encoder with the one or more modifications to the new video content.

The video encoder analysis logic 118 determines whether the one or more modifications to the encoding process results in improved performance when encoding the new video content. The video encoder is configured to use the one or more modifications to the encoding process during active time periods when it is determined that the one or more modifications to the encoding process results in improved performance.

The devices 110(1)-110(N) will transmit and receive new encoder strategy configurations in order to seed its searching/self-analysis process. This is described above in connection with FIG. 5. Thus, the method 600 may further include receiving from a central entity (e.g., the central encoder control server 130) one or more encoder process modifications. The analysis operation 630 may be performed based on (seeded by) the one or more encoder process modifications received from the central entity.

Furthermore, the identifying operation 610 may further include distinguishing between different classes of video content to adopt different encoding strategies depending on the types of content. In other words, the identifying operation may further include distinguishing between different classes of video content and identifying different modifications to the encoding process for different classes of video content. For example, on a global level, video may be classified into screen content (computer graphics, slide shows, documents or text), sport, natural content, or urban content. Individual regions or blocks of video may be classified as containing text or artificial graphics, by sharpness, smoothness or flatness, or by the presence of static texture (e.g. a pan over a brick wall) or dynamic texture (e.g. leaves moving in the wind).

Further still, the analysis operation 630 may involve computing feature vectors for multiple portions of video content, and the identifying operation is performed based on the feature vectors. Encoder process configurations may be classified according to the feature vectors. Examples of feature vectors could include combinations of measures indicating the degree of sharpness, the presence of edges of different orientations, the amount of static or dynamic detail, the presence of text, the presence of human faces or skin tone.

Further yet, the devices 110(1)-110(N) may receive from the central entity (central encoder control server 130) the feature vectors and information describing methods for computing the feature vectors for use in classifying video content and applying different encoder configurations and processes.

Moreover, the devices 110(1)-110(N) may receive from the central entity one or more heuristics and cost metrics that the video encoder may use to make encoder decisions. The analysis operation 630 involves determining which of the one or more heuristics and/or cost metrics to use in order to adapt the encoding process used by the video encoder. The one or more modifications may be identified as applying to a class of video content.

The embodiments described herein allow a deployed video encoder to report back optimizations (and, if allowed and feasible, the video used to generate them) to a central entity which can be collated to produce new encoder defaults for more controlled and centralized testing. Thus, the identifying operation 610, storing operation 620, analyzing operation 630 and determining operation 640 are performed at each of a plurality of video encoders. Each of the plurality of video encoders send to a central entity the one or more modifications to the encoding process that results in improved performance of the video encoder. This enables the central entity to further analyze the one or more modifications (and perhaps the captured snippets of video) received across the plurality of video encoders.

If the central entity receives the captured snippets from one or more encoders in the field, the snippet(s) become part of a large and evolving test set that the encoder (and the community of encoders) may use to optimize encoding algorithms. Tuning of the encoding algorithms may involve running over this test set as a background task. The tuning may involve encoding with a given set of parameters at multiple rates or quality points so as to calculate BDR gains across a bitrate range. The encoder in one of the devices 110(1)-110(N) may also run at a number of different operating points in order to trade off speed against quality.

As an extension to the concepts described above, there are various common blocks in video codecs that could be redesigned in the light of more extensive testing. This includes entropy coding contexts, merging or splitting syntax elements, design of interpolation filters, quantization matrices, and so on. Although these will have been heavily optimized in standards development, this would only have happened for a limited range of test material and in the context of a full-search, very slow video encoder. Very often it turns out that only a subset of tools in a video encoder is really useful, and it may also be the case that parameters for those tools could be better designed for a real-time encoder or different operating points.

One example of this would be tuning interpolation filters or in-loop filters (de-blocking, de-ringing etc.). Over time, through software updates, an encoder may be provided with a large range of potential heuristics and cost metrics which it may use to make encoder decisions. By online tuning, encoders can determine the best heuristics to use. High-level encoder strategies may themselves be adapted accordingly.

Figure 7:
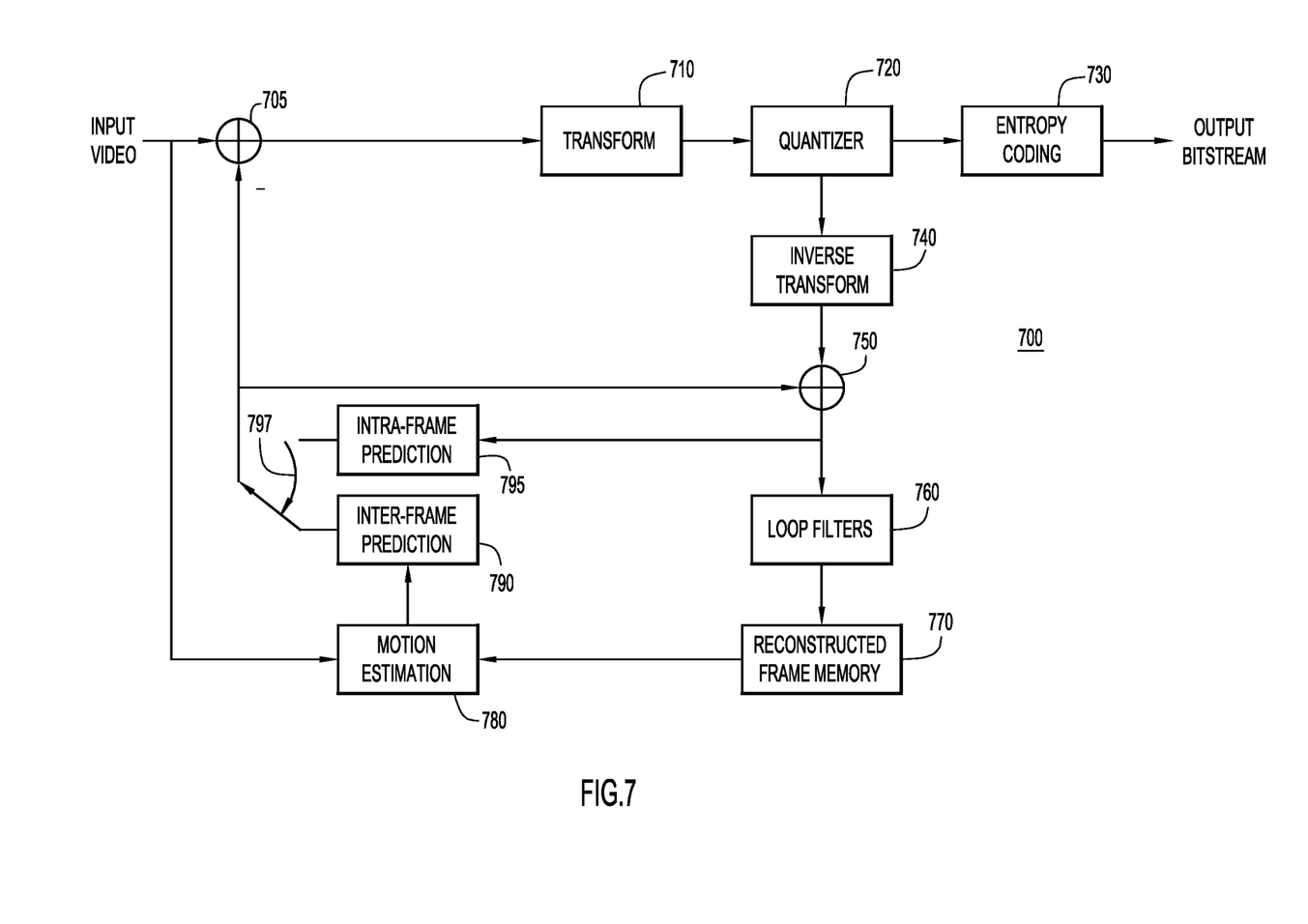
FIG. 7 is a block diagram of a video encoder, according to an example embodiment.

Referring to FIG. 7, a block diagram of a video encoder is shown at reference numeral 700. The video encoder 700 is representative of the video encoder 120 shown in FIG. 1 and described above, for which the aforementioned techniques may be employed to modify the operations thereof. The video encoder 700 includes a subtractor 705, a transform unit 710, a quantizer unit 720, an entropy coding unit 730, an inverse transform unit 740, an adder 750, one or more loop filters 760, a reconstructed frame memory 770, a motion estimation unit 780, an inter-frame prediction unit 790, an intra-frame prediction unit 795 and a switch 797.

A current frame (input video) as well as a prediction frame are input to a subtractor 705. The subtractor 705 is provided with input from either the inter-frame prediction unit 790 or intra-frame prediction unit 795, the selection of which is controlled by switch 797. Intra-prediction processing is selected for finding similarities within the current image frame, and is thus referred to as "intra" prediction. Motion compensation has a temporal component and thus involves analysis between successive frames that is referred to as "inter" prediction. The motion estimation unit 780 supplies a motion estimation output as input to the inter-frame prediction unit 790. The motion estimation unit 780 receives as input the input video and an output of the reconstructed frame memory 770.

The subtractor 705 subtracts the output of the switch 797 from the pixels of the current frame, prior to being subjected to a two dimensional transform process by the transform unit 710 to produce transform coefficients. The transform coefficients are then subjected to quantization by quantizer unit 720 and then supplied to entropy coding unit 730. Entropy coding unit 730 applies entropy encoding in order to remove redundancies without losing information, and is referred to as a lossless encoding process. Subsequently, the encoded video data is arranged in network packets via a packetizer (not shown), prior to be transmitted in an output bit stream.

The output of the quantizer unit 720 is also applied to the inverse transform unit 740 and used for assisting in prediction processing. The adder 750 adds the output of the inverse transform unit 740 and an output of the switch 797 (either the output of the inter-frame prediction unit 790 or the intra-frame prediction unit 795). The output of the adder 750 is supplied to the input of the intra-frame prediction unit 795 and to one or more loop filters 760 which suppress some of the sharpness in the edges to improve clarity and better support prediction processing. The output of the loop filters 760 is applied to a reconstructed frame memory 770 that holds the processed image pixel data in memory for use in subsequent motion processing by motion estimation block 780.

Figure 8:
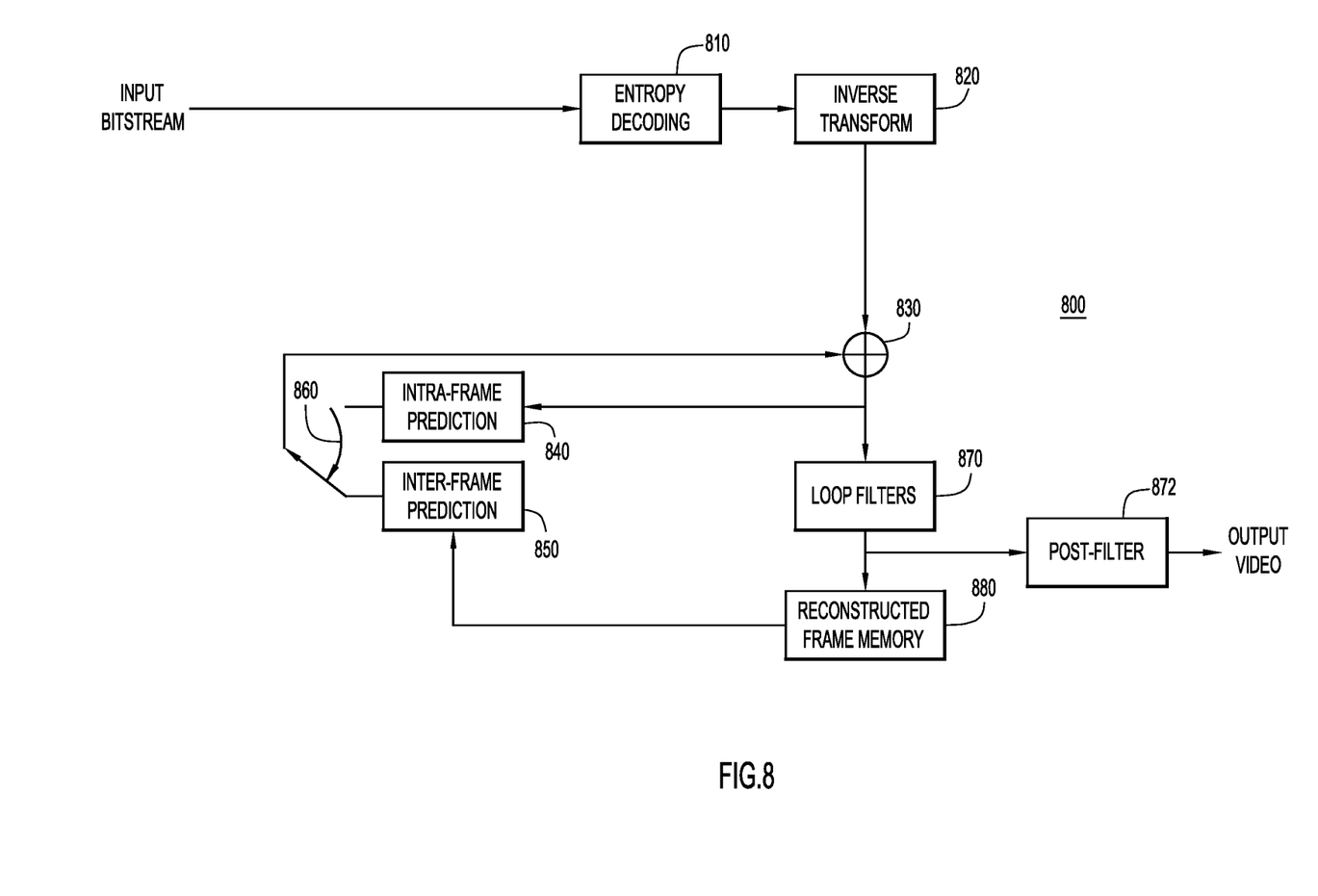
FIG. 8 is a block diagram of a video decoder, according to an example embodiment.

Turning to FIG. 8, a block diagram of a video decoder is shown at reference numeral 800. While the aforementioned techniques have been described with respect to a video encoder, it is to be understood that a video decoder generally tracks the operations performed by the video encoder from which it receives encoded video. Thus, the improvement modifications derived for the encoder will be mirrored on a video decoder that is decode video from that video encoder. Therefore, for completeness, a description of a video decoder is included herein.

The video decoder 800 includes an entropy decoding unit 810, an inverse transform unit 820, an adder 830, an intra-frame prediction unit 840, an inter-frame prediction unit 850, a switch 860, one or more loop filters 870, a post filter 872 and a reconstructed frame memory 880. The entropy coding unit 810 is configured to perform the arithmetic decoding operations described herein. The order of the filters need to agree with the order used in the encoder. In addition, a post-filter 872 is shown in FIG. 8. The entropy decoding unit 810 performs entropy decoding on the received input bitstream to produce quantized transform coefficients which are applied to the inverse transform unit 820. The inverse transform unit 820 applies two-dimensional inverse transformation on the quantized transform coefficients to output a quantized version of the difference samples. The output of the inverse transform unit 820 is applied to the adder 830. The adder 830 adds to the output of the inverse transform unit 820 an output of either the intra-frame prediction unit 840 or inter-frame prediction unit 850. The loop filters 870 operate similar to that of the loop filters 760 in the video encoder 700 of FIG. 7. An output video image is taken at the output of the post-filter 872.

The video encoder 700 of FIG. 7 and the video decoder 800 of FIG. 8 may be implemented by digital logic gates in an integrated circuit (e.g., by an application specific integrated circuit) or by two or more separate logic devices. Alternatively, the video encoder 700 and video decoder 800 may be implemented by software executed by one or more processors, as described further in connection with FIG. 9, below.

Each of the functional blocks in FIGS. 7 and 8 are executed for each coding block, prediction block, or transform block.

Figure 9:
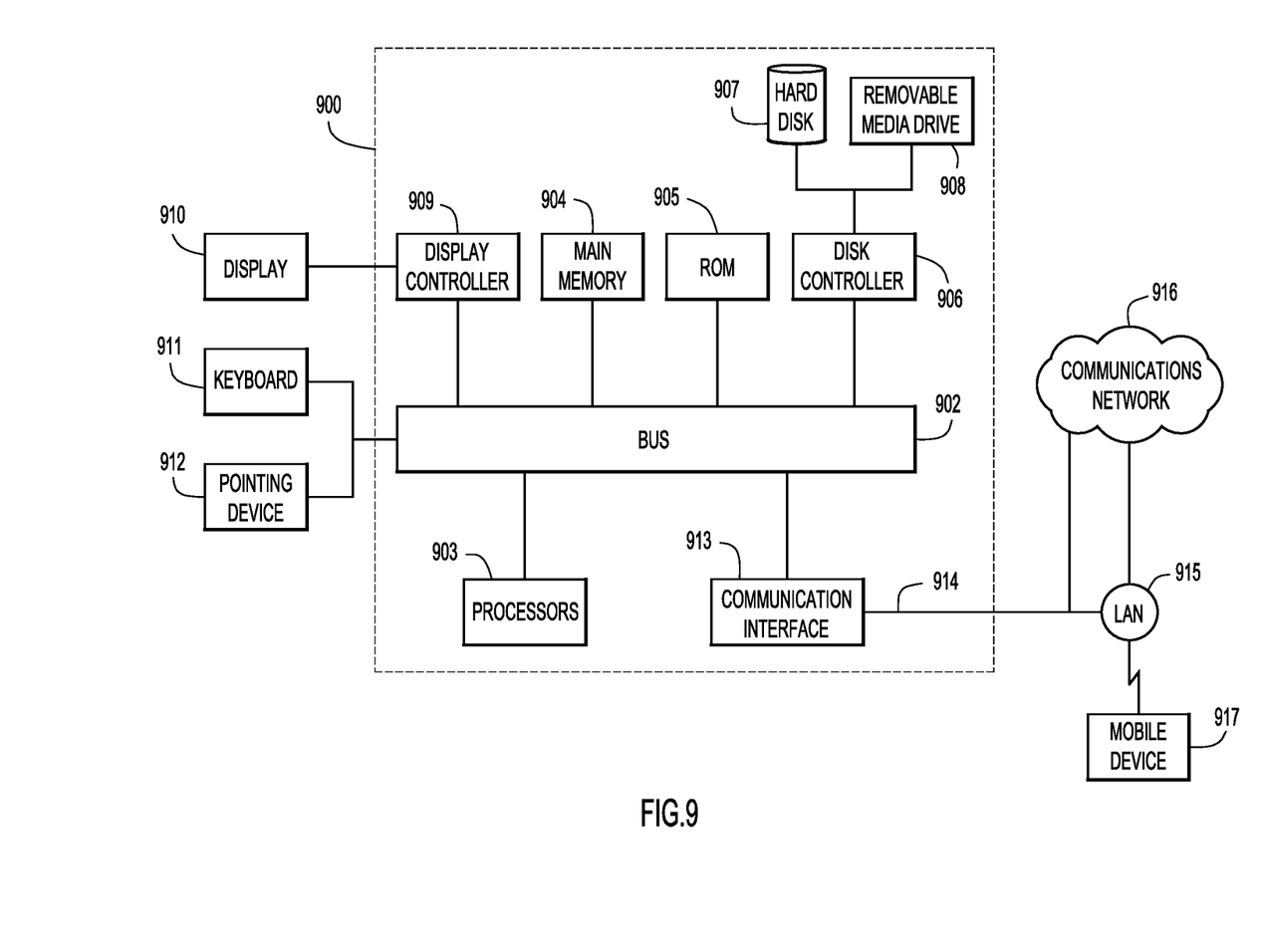
FIG. 9 is a block diagram of a computing device in which the techniques presented herein may implemented, according to an example embodiment.

FIG. 9 illustrates a computer system 900 upon which an embodiment of the present invention may be implemented. The computer system 900 may be programmed to implement a computer based device, such as a video conferencing endpoint or any device includes a video encoder or decoder for processing real time video images. The computer system 900 includes a bus 902 or other communication mechanism for communicating information, and a processor 903 coupled with the bus 902 for processing the information. While the figure shows a single block 903 for a processor, it should be understood that the processors 903 represent a plurality of processing cores, each of which can perform separate processing. The computer system 900 also includes a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903.

The computer system 900 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 900 also includes a disk controller 906 coupled to the bus 902 to control one or more storage devices for storing information and instructions, such as a magnetic hard disk or solid state hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 900 using an appropriate device interface (e.g., small computer system interface (SCSI), integrated device electronics (IDE), enhanced-IDE (E-IDE), direct memory access (DMA), or ultra-DMA).

The computer system 900 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 000 may also include a display controller 009 coupled to the bus 002 to control a display 010, such as a cathode ray tube (CRT), liquid crystal display (LCD), light emitting diode (LED) display, etc., for displaying information to a computer user. The computer system 000 includes input devices, such as a keyboard 011 and a pointing device 012, for interacting with a computer user and providing information to the processor 003. The pointing device 012, for example, may be a mouse, a trackball, or a pointing stick for communicating direction information and command selections to the processor 603 and for controlling cursor movement on the display 910.

The computer system 900 performs a portion or all of the processing steps of the invention in response to the processor 903 executing one or more sequences of one or more instructions contained in a memory, such as the main memory 904. Such instructions may be read into the main memory 904 from another computer readable medium, such as a hard or solid state disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 900 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 900, for driving a device or devices for implementing the invention, and for enabling the computer system 900 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 900 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local area network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 900 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 900 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

To summarize, presented herein is a system and method of distributed learning for video encoders whereby decision methods, tools and heuristics are adapted by re-encoding video during encoder down-time. Encoder algorithm parameters and decision processes may be adapted locally and centrally collated from widespread deployments. This system allows for learning from real-world video encoder deployments to be exploited to improve the quality produced by that encoder and to feedback to improve the quality produced by all deployments. It also can give valuable information on the performance of tools in the real-world and produce video codec variants that are better suited to real-time encoding strategies.

One use of the distributed learning techniques presented herein is to develop future video tools more effectively. The encoders would not use these modified tools until or unless they were updated to do so, with some new version of a specification. Instead they would help us develop future video standards with tools that were tested on an enormous range of real video with real video encoders.

Another use case is to be able to design video codec metrics that cannot be easily gamed (for example by putting in very large intra frames). An advantage of the distributed learning system presented herein is that the effective test set is created is enormous and evaluation can be done with different metrics using different video to the tuning. Even as the potential search space for video codec metrics explodes, intelligent heuristics generated according to the distributed learning system presented herein can navigate this search space for a real high-performing encoder.

In summary, on one form, a method is provided comprising: at a video encoder, identifying one or more portions of video content that was encoded by the video encoder, the one or more portions of video content to be analyzed for improving encoding performance of the video encoder; storing the one or more portions of the video content; during an idle time period of the video encoder, analyzing the one or more portions of video content in combination with a test set stored by the video encoder in order to modify one or more functions of an encoding process used by the video encoder; and based on the analyzing, determining one or more modifications to the encoding process that results in improved performance of the video encoder.

In another form, an apparatus is provided comprising: a video encoder configured to encode video content; a memory; a processor coupled to the video encoder and the memory, wherein the processor is configured to: identify one or more portions of video content that was encoded by the video encoder, the one or more portions of video content to be analyzed for improving encoding performance of the video encoder; store the one or more portions of the video content; during an idle time period of the video encoder, analyze the one or more portions of video content in combination with a test set stored by the video encoder in order to modify one or more functions of an encoding process used by the video encoder; and determine one or more modifications to the encoding process that results in improved performance of the video.

In still another form, a system is provided comprising: a plurality of devices that include a video encoder configured to encode video content, a memory and a processor coupled to the video encoder and the memory, wherein the processor is configured to: identify one or more portions of video content that was encoded by the video encoder, the one or more portions of video content to be analyzed for improving encoding performance of the video encoder; store the one or more portions of the video content; during an idle time period of the video encoder, analyze the one or more portions of video content in combination with a test set stored by the video encoder in order to modify one or more functions of an encoding process used by the video encoder; and determine one or more modifications to the encoding process that results in improved performance of the video; and a server configured to send one or more encoder process modifications to the devices to cause the processor in each device to analyze the one or more portions of video content based on the one or more encoder process modifications. Each of the plurality of devices may be configured to send to the server the one or more modifications to the encoding process that results in improved performance of the respective video encoder, to enable the server to further analyze the one or more modifications received across the video encoders of the plurality of devices. Furthermore, the processor of the one or more of the plurality of devices is configured to receive from the server one or more heuristics and cost metrics that the video encoder may use to make encoder decisions, and to determine which of the one or more heuristics and/or cost metrics to use in order to adapt the encoding process used by the video encoder.

In yet another form, one or more non-transitory computer readable storage media are provided encoded with instructions that, when executed by a processor, cause the processor to perform operations including: identifying one or more portions of video content that was encoded by a video encoder, the one or more portions of video content to be analyzed for improving encoding performance of the video encoder; storing the one or more portions of the video content; during an idle time period of the video encoder, analyzing the one or more portions of video content in combination with a test set stored by the video encoder in order to modify one or more functions of an encoding process used by the video encoder; and based on the analyzing, determining one or more modifications to the encoding process that results in improved performance of the video encoder.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a video encoder, identifying, during an active time period of the video encoder, one or more portions of video content encoded by the video encoder, the one or more portions of video content identified to improve encoding performance of the video encoder;
   storing the one or more portions of the video content during the active time period of the video encoder;
   during an idle time period of the video encoder, analyzing the one or more portions of video content in combination with a test set stored by the video encoder in order to modify one or more functions of an encoding process used by the video encoder; and
   based on the analyzing, determining one or more modifications to the encoding process that results in improved performance of the video encoder.

2. The method of claim 1, further comprising:
   storing state of the video encoder during the active time period while the video encoder encoded the one or more portions of video content, the state including content of internal buffers and data of state variables of the encoding process.

3. The method of claim 2, wherein further comprising:
   capturing and storing new video content obtained by the video encoder; and
   during an idle time period of the video encoder, applying the encoding process using the state of the video encoder with the one or more modifications to the new video content.

4. The method of claim 3, further comprising:
   determining whether the one or more modifications to the encoding process results in improved performance when encoding the new video content; and
   configuring the video encoder to use the one or more modifications to the encoding process during active time periods when it is determined that the one or more modifications to the encoding process results in improved performance.

5. The method of claim 1, wherein identifying includes identifying the one or more portions of video content according to whether the one or more portions are one or more of: video content that results in poor quality after encoding, video content that is typical to the video encoder; or video content that is atypical to the video encoder.

6. The method of claim 1, further comprising receiving from a central entity one or more encoder process modifications; and
   wherein the analyzing is performed further based on the one or more encoder process modifications received from the central entity.

7. The method of claim 1, wherein the identifying further comprises distinguishing between different classes of video content and identifying different modifications to the encoding process for different classes of video content.

8. The method of claim 7, wherein analyzing comprises computing feature vectors for multiple portions of video content, and wherein identifying is performed based on the feature vectors, and further comprising classifying encoder process configurations according to the feature vectors.

9. The method of claim 8, further comprising:
   receiving from a central entity feature vectors and information describing methods for computing the feature vectors for use in classifying video content and applying different encoder configurations and processes.

10. The method of claim 7, further comprising receiving from the central entity one or more heuristics and cost metrics that the video encoder may use to make encoder decisions, and wherein analyzing comprises determining which of the one or more heuristics and/or cost metrics to use in order to adapt the encoding process used by the video encoder.

11. The method of claim 10, wherein the one or more modifications are identified as applying to a class of video content.

12. The method of claim 1, wherein the identifying, storing, analyzing and determining are performed at each of a plurality of video encoders, and further comprising each of the plurality of video encoders sending to a central entity the one or more modifications to the encoding process that results in improved performance of the video encoder, to enable the central entity to further analyze the one or more modifications received across the plurality of video encoders.

13. An apparatus comprising:
    a video encoder configured to encode video content;
    a memory;
    a processor coupled to the video encoder and the memory, wherein the processor is configured to:
    identify, during an active time period of the video encoder, one or more portions of video content encoded by the video encoder, the one or more portions of video content identified to improve encoding performance of the video encoder;
    store the one or more portions of the video content during the active time period of the video encoder;

during an idle time period of the video encoder, analyze the one or more portions of video content in combination with a test set stored by the video encoder in order to modify one or more functions of an encoding process used by the video encoder; and determine one or more modifications to the encoding process that results in improved performance of the video.

14. The apparatus of claim 13, wherein the processor is further configured to:

store state of the video encoder during the active time period while the video encoder encoded the one or more portions of video content, the state including content of internal buffers and data of state variables of the encoding process;

capture and store new video content obtained by the video encoder;

during an idle time period of the video encoder, apply the encoding process using the state of the video encoder with the one or more modifications to the new video content;

determine whether the one or more modifications to the encoding process results in improved performance when encoding the new video content; and configure the video encoder to use the one or more modifications to the encoding process during active time periods when it is determined that the one or more modifications to the encoding process results in improved performance.

15. The apparatus of claim 13, wherein the processor is configured to identify the one or more portions of video content according to whether the one or more portions are one or more of: video content that results in poor quality after encoding, video content that is typical to the video encoder; or video content that is atypical to the video encoder.

16. The apparatus of claim 13, wherein the processor is configured to distinguish between different classes of video content and identify different modifications to the encoding process for different classes of video content.

17. A system comprising:

a plurality of devices that include a video encoder configured to encode video content, a memory and a processor coupled to the video encoder and the memory, wherein the processor is configured to:

identify, during an active time period of the video encoder, one or more portions of video content that was encoded by the video encoder, the one or more portions of video content identified to improve encoding performance of the video encoder;

store the one or more portions of the video content during the active time period of the video encoder;

during an idle time period of the video encoder, analyze the one or more portions of video content in combination with a test set stored by the video encoder in order to modify one or more functions of an encoding process used by the video encoder; and determine one or more modifications to the encoding process that results in improved performance of the video; and a server configured to send one or more encoder process modifications to the devices to cause the processor in each device to analyze the one or more portions of video content based on the one or more encoder process modifications.

18. The system of claim 17, wherein the processor of one or more of the plurality of devices is configured to identify one or more portions of video content by distinguishing between different classes of video content and identifying different modifications to the encoding process for different classes of video content.

19. The system of claim 18, wherein the processor of the one or more of the plurality of devices is configured to analyze by computing feature vectors for multiple portions of video content based on which the processor identifies the one or more portions of video content, and the processor is further configured to classify encoder process configurations according to the feature vectors.

20. The system of claim 19, wherein the processor of the one or more of the plurality of devices is configured to receiving from the server feature vectors and information describing methods for computing the feature vectors for use in classifying video content and applying different encoder configurations and processes.

21. The system of claim 19, wherein the processor of the one or more of the plurality of devices is configured to receive from the server one or more heuristics and cost metrics that the video encoder may use to make encoder decisions, and to determine which of the one or more heuristics and/or cost metrics to use in order to adapt the encoding process used by the video encoder.

22. The system of claim 17, further comprising each of the plurality of devices configured to send to the server the one or more modifications to the encoding process that results in improved performance of the respective video encoder, to enable the server to further analyze the one or more modifications received across the video encoders of the plurality of devices.

* * * * *